April 4, 1967 D. H. DRAKE 3,311,977
TOOTH FINISHING APPLIANCE
Filed Feb. 12, 1964

INVENTOR.
DANIEL H. DRAKE
BY
*Malcolm S. Bradway*
ATTORNEY

United States Patent Office 3,311,977
Patented Apr. 4, 1967

3,311,977
TOOTH FINISHING APPLIANCE
Daniel H. Drake, 244 Bartram Road,
Riverside, Ill. 60546
Filed Feb. 12, 1964, Ser. No. 344,372
2 Claims. (Cl. 32—14)

The present invention is directed to new and useful improvements in finishing appliances for orthodontics.

In recent years, finishing appliances customarily have been used after tooth correcting bands, arch wires and the like have been removed from the patient's mouth by the orthodontist. These finishing appliances oftentimes take the form of a rubber or rubberlike mouthpiece which has tooth impressions therein corresponding to the desired final positioning of the teeth of the patient. In this regard, the teeth of the patient are not in the final position desired after removal of bands and the like. Through use of an appliance of the type described, the patient, by wearing the mouthpiece at night and by exercising the jaws during the day with the mouthpiece, gradually forces the teeth into the desired final position due to the forces imparted by the tooth impressions in the mouthpiece.

These appliances are customarily made from rubber or rubberlike material and are stretched slightly when inserted in position over the teeth of the patient.

When so positioned, the resilient action of the appliance holds it in place as well as exerting resilient correcting forces on the teeth. It is generally difficult to correctly position the appliance over the teeth due to the fact that the appliance must be stretched in order to snap it into position over the posterior teeth. This stretching movement can be accomplished efficiently only by engaging the appliance with the anterior teeth while forcing the posterior portions of the appliance into correct position over the posterior teeth by such stretching as is accomplished by finger pressure applied to the opposite sides of the appliance. Slippage of the fingers occurs quite easily, especially due to the fact that the appliance is generally moist because of saliva or water after it has been cleaned.

With the foregoing in mind, a major purpose of the present invention is to so form such an appliance as to enable a more facile positioning of the appliance on the teeth, while enhancing the resilient action of the appliance which is necessary to the tooth correcting function of the appliance, and while enabling the foregoing without adverse effects on the patient.

Other and related objects will become more apparent in the course of the ensuing specification and claims, when taken with the accompanying drawings, in which:

Figure 1:
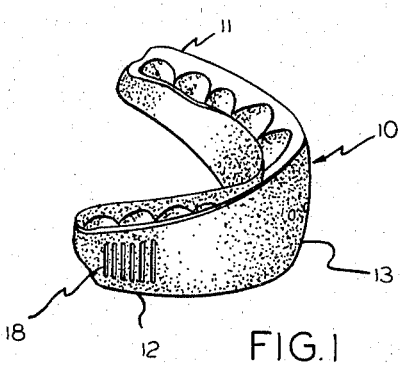
FIGURE 1 is a perspective view of a finishing appliance incorporating the principles of the present invention.
Figure 2:
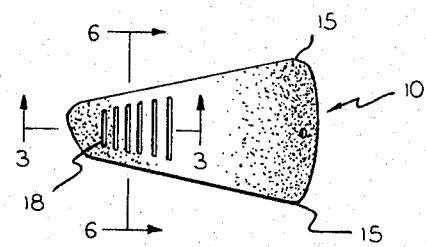
FIGURE 2 is a side view of the appliance illustrated in FIGURE 1.
Figure 3:
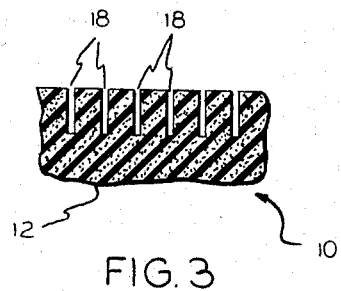
FIGURE 3 is a sectional view of a portion of the appliance illustrated in FIGURE 2 and taken on the section lines 3—3 of FIGURE 2.
Figure 4:
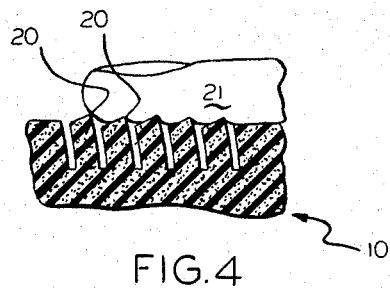
FIGURE 4 is a view similar to FIGURE 3 while illustrating a certain operative condition of the appliance as illustrated in FIGURE 3.
Figure 5:
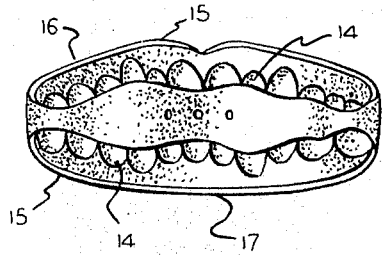
Figure 6:
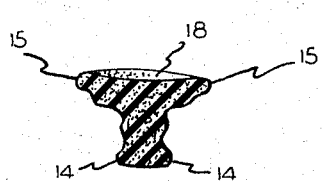

FIGURE 5 is a rear view of the appliance illustrated in FIGURES 1 through 4 inclusive; and FIGURE 6 is a sectional view of the appliance of FIGURES 1 and 2 taken on the section line 6—6 of FIGURE 2.

Like elements are designated by like characters throughout the specification and drawings.

With particular reference now to the drawings and in the first instance to FIGURE 1, a finishing appliance is generally designated at 10. The appliance may be comprised of a body of rubber or rubberlike material capable of distortion and having resiliency. The finishing appliance body may have a generally U-shaped form as is, for example, described in U.S. Patent to Kessling No. 2,467,432, or Kessling United States Patent No. 2,775,-036. The body has opposite legs 11 and 12 extending from a bight portion 13. The bight portion of the appliance is adapted to fit over the anterior teeth or incisors of the patient while the leg portions 11 and 12 extend posteriorly therefrom and are adapted to fit over the posterior, or remaining, teeth of the patient.

The body 10 may be formed with inner and outer rim surfaces, 14 and 15 respectively, the outer portions of which are adapted to overlie the labial and buccal gingival tissues. Outer rim surface 15 has a greater vertical height than the inner rim surface 14. The inner rim overlies only a small portion of the palatel gingival tissues while the outer rim overlies a larger amount of gingival tissue.

Toothlike impressions or sockets 16 are formed in the body of the appliance between the inner and outer rims 14 and 15. One group of sockets opens upwardly and another group downwardly so as to receive both maxiallary and mandibular teeth when they are moved toward the normal closed position. These toothlike impressions are spaced in accordance with the desired final spacing and positioning of the teeth of the patient so that when the appliance is fitted over the teeth of the patient, the toothlike impressions and the resilient body apply corrective forces to the teeth. These forces may be rotating forces, spacing or consolidating forces, raising or lowering forces, or torquing forces as desired in the particular patient.

The outer surface and inner surface of the body at the sides of the legs and at the bight portion of the body have a smooth surface texture so as to avoid or minimize any abrasive or irritating action to the gingival and mucosal tissues of the mouth.

Appliances of the type illustrated herein are customarily fitted over the upper teeth by first engaging the anterior or bight portion 17 of the outer rim 15 over the maxillary incisors and canines, then by gripping the opposite and outer side surfaces of the legs of the appliance, the appliance may be stretched slightly and fitted over the remaining and posterior teeth. The appliance is thus held in position over the upper teeth by the resilient action of the body. When so placed, it is correctly positioned to receive the lower teeth.

In accordance with the present invention, the outer side surfaces of the legs of the body are provided with a plurality of spaced slots 18. These slots extend generally transversely to the length of the legs and preferably have widths such that the material between the slots has a greater width between the slots than the width of the slots themselves, as is seen in FIGURE 3. The slots have lengths such, as is seen in FIGURE 6, that they terminate short of the outer portions of the rims 15, although the slots preferably have lengths such that they comprise a substantial portion of the height of the outer surfaces of the legs 11 and 12.

The slots preferably have an arcuate form as is seen in FIGURE 6 so that the body of the appliance surrounding the slot, as is seen in FIGURE 6, tends to have a uniform thickness. In this regard, it may be appreciated that the rubberlike body is thinnest at the upper and lower portions of the rim surface 15 so that the arcuate form of the slots or grooves, when considered with their length and spacing from the marginal edges of the rim portions 15, do not diminish the material near the marginal edges of the rim surfaces.

The slots or grooves 18 may be easily formed in the outer surfaces of the legs 11 and 12 through use of a rotary cutting blade so as to produce the arcuate form illustrated. Approximately 3 to 10 such grooves or slots may be provided in the outer surfaces of the legs of the appliance.

Through use of the slots or grooves in the legs of the appliance, as described herein, the appliance is more easily gripped and manipulated when inserting the appliance within the patient's mouth and when positioning it over the lower teeth. When gripped at the outer surfaces of the legs, finger pressure exerted over the slotted area tends to stretch the leg portions and causes the material between the slots or grooves to bend or distort, as is illustrated in FIGURE 4, thereby presenting corners or edges 20 at the material between the slots for increased gripping power by the fingers of the person holding the appliance. In the absence of such pressure, the outer surfaces of the legs remain essentially smooth. Thus, the slots, while enabling more facile gripping of the appliance, do not adversely affect the buccal tissue around the outer surfaces of the legs when the appliance is in place in the patient's mouth.

The width of the slots or grooves should be held to a minimum so as to prevent buccal surface tissue from working into the slots or grooves. At the same time, the slots must be sufficiently wide, with the spacing between the slots being such, that when the outer surfaces of the legs are stroked with pressure insufficient to distort the normal shape of the body, the outer surfaces remain essentially smooth, while at the same time enabling distortion of the material between the slots and presentation of the roughened surface illustrated in FIGURE 4 when stroked with pressure which is sufficient to distort the body from its normal shape, or its normal U-shaped disposition (as when the legs are bent toward one another).

By forming slots in the outer surfaces of the legs, as described, the material of the body is diminished at its thickest section which tends to diminish the force necessary to stretch the legs in the direction of their length slightly when fitting the appliance over the teeth. This can be appreciated in FIGURE 6 wherein the thickest section of the body, which is that most resistant to stretching movement is that portion between the center of the outer surfaces of the legs and the interior center of the body. Notwithstanding the slots or grooves, the body maintains sufficient resiliency and strength so as to apply the necessary corrective forces. The overall resilient action is improved by the slots. This greater resilient action due to the grooves, allows not only a better correction of the malocclusion of the teeth, but also gives this appliance a greater range of effectiveness and therefore provides more correction capabilities to greater malocclusions.

In this regard, children find it extremely difficult to properly engage previous appliances with all of the teeth, especially the molars. Oftentimes, children have used former appliances with the appliance engaged with the anterior teeth while one or more of the posterior teeth are not seated within the sockets, because of the difficulty in fitting the appliance and because a child has some difficulty in understanding when the appliance is properly fitted. In these cases, the appliance does not give all of the corrective forces intended.

It follows that fixed appliances of correcting bands, arch wires and the like, can be removed earlier with the same end correction by the use of the finishing appliance thus described. This should reduce the orthodontic treatment time with the fixed appliances and allow more comfort and freedom to the patient during orthodontic treatment by fixed and removable appliances. With the increased versatility of the above removable appliance, it is possible to correct some malocclusions without the use of correcting bands, arch wires and the like heretofore impossible to be accomplished.

The slots or grooves may be easily cleaned through use of a brush. The bristles of a brush easily sweep out any dirt or the like from the arcuate bottoms of the slots.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. An orthodontic finishing appliance including a resilient body of mouthpiece form for insertion over the teeth, said body being of a generally U-shaped normal form with toothlike impressions in upper and lower surfaces of said body to thereby enable fitting of the upper and lower teeth into said impressions and application of corrective forces thereto, said body having inner and outer rims on opposite sides of said impressions and spaced on opposite sides thereof, said outer rim having a greater height than said inner rim to enable a pressure engagement of said outer rim with the surfaces of teeth without a seating engagement of teeth within said impressions, the outer surfaces of the legs of said U-shaped body having a plurality of narrow, spaced, substantially transverse slots adapted to provide therebetween a series of extending spacedly arranged ribs, the outwardly extending planar surfaces of each of which lie coplanar with the outer surface of the leg, the width of each slot, the spacing between slots and the resiliency of the body being such as to maintain essentially smooth surfaces when stroked with pressure insufficient to distort the normal shape of said body, while enabling distortion of the ribs between said slots and presentation of a roughened surface when stroked with pressure sufficient to distort said body from said normal shape.

2. The appliance of claim 1 wherein said slots are rectilinear and have curvilinear bottom defining walls which lead from points of mergence with said outer surfaces to points of maximum depth of the slots at a central portion of said body.

References Cited by the Examiner

UNITED STATES PATENTS

| 207,708 | 9/1878 | Boyer | 128—133 X |
| 2,479,780 | 8/1949 | Remensnyder | 32—14 |
| 2,789,351 | 4/1957 | Gordon | 32—14 |
| 3,178,820 | 4/1965 | Kesling | 32—14 |

FOREIGN PATENTS

| 401,796 | 4/1909 | France. |
| 273,842 | 6/1951 | Switzerland. |

ROBERT E. MORGAN, *Acting Primary Examiner.*

RICHARD A. GAUDET, *Examiner.*

J. W. HINEY, JR., *Assistant Examiner.*